(12) United States Patent
Kim (10) Patent No.: US 9,108,594 B2
(45) Date of Patent: Aug. 18, 2015

(54) MULTI-ADAPTER FOR A VEHICLE WIPER

(75) Inventor: Tae Hun Kim, Dalseong-gun Daegu (KR)

(73) Assignee: CAP CORPORATION, Dalseo-Gu Daegu (KR)

( * ) Notice: Subject to any disclaimer, the term of this patent is extended or adjusted under 35 U.S.C. 154(b) by 0 days.

(21) Appl. No.: 13/392,342

(22) PCT Filed: Aug. 24, 2010

(86) PCT No.: PCT/KR2010/005646
§ 371 (c)(1),
(2), (4) Date: Feb. 24, 2012

(87) PCT Pub. No.: WO2011/025226
PCT Pub. Date: Mar. 3, 2011

(65) Prior Publication Data
US 2012/0144616 A1   Jun. 14, 2012

(30) Foreign Application Priority Data

Aug. 26, 2009   (KR) ........................ 10-2009-0079242

(51) Int. Cl.
*B60S 1/40*   (2006.01)
*B60S 1/38*   (2006.01)

(52) U.S. Cl.
CPC .............. *B60S 1/387* (2013.01); *B60S 1/4003* (2013.01); *B60S 1/4006* (2013.01); *B60S 1/407* (2013.01); *B60S 1/4009* (2013.01); *B60S 1/3881* (2013.01); *B60S 1/4074* (2013.01); *B60S 1/4077* (2013.01); *B60S 2001/408* (2013.01)

(58) Field of Classification Search
CPC .... B60S 1/4067; B60S 1/4074; B60S 1/4077; B60S 1/407; B60S 1/387
USPC ............. 15/250.32, 250.351, 250.43, 250.44, 15/250.201, 250.361
See application file for complete search history.

(56) References Cited

U.S. PATENT DOCUMENTS

| | | | |
|---|---|---|---|
| 2,031,297 | A | 2/1936 | Anderson |
| 2,046,495 | A | 7/1936 | Whitted |
| 2,697,241 | A | 12/1954 | Oishei |
| 2,782,445 | A | 2/1957 | Krohm |
| 2,782,447 | A | 2/1957 | Anderson |

(Continued)

FOREIGN PATENT DOCUMENTS

| | | |
|---|---|---|
| DE | 1028896 | 4/1958 |
| DE | 1247161 | 8/1967 |

(Continued)

OTHER PUBLICATIONS

International Search Report for PCT/KR2010/005646, English translation attached to original, Both completed by the Korean Patent Office on May 16, 2011, All together 5 pages.

*Primary Examiner* — Monica Carter
*Assistant Examiner* — Michael Jennings
(74) *Attorney, Agent, or Firm* — Brooks Kushman P.C.

(57) ABSTRACT

A multi-adapter for a vehicle wiper, having a joining portion coupled to a wiper blade with a pair of side plates protruding from the joining portion such that the side plates are parallel to each other. The side plates have a plurality of pin coupling portions formed at the pair of side plates, and to which wiper arm with pins of different sizes are selectively coupled. A plurality of protrusions are formed, on at least one of the pair of the side plates so as to maintain a gap between the wiper arm and the pair of side plates.

6 Claims, 5 Drawing Sheets

(56) References Cited

U.S. PATENT DOCUMENTS

| | | | |
|---|---|---|---|
| 2,782,449 A | 2/1957 | Anderson | |
| 2,814,820 A | 12/1957 | Elliott | |
| 2,920,336 A | 1/1960 | Anderson | |
| 2,924,840 A | 2/1960 | Anderson | |
| 2,974,341 A | 3/1961 | Hart | |
| 3,088,155 A | 5/1963 | Smithers | |
| 3,116,510 A | 1/1964 | Oishei | |
| 3,176,336 A | 4/1965 | Scinta | |
| 3,179,969 A | 4/1965 | Glynn | |
| 3,224,028 A | 12/1965 | Peras et al. | |
| 3,605,168 A | 9/1971 | Moorhead | |
| 3,641,614 A | 2/1972 | Newsome | |
| 3,798,703 A | 3/1974 | Den Berg et al. | |
| 3,838,475 A | 10/1974 | Quinlan et al. | |
| 3,845,519 A | 11/1974 | Quinlan | |
| 3,881,324 A | 5/1975 | Girquis | |
| 3,885,265 A | 5/1975 | Deibel | |
| 4,063,328 A | 12/1977 | Arman | |
| 4,083,642 A | 4/1978 | Journee | |
| 4,094,038 A | 6/1978 | Hancu | |
| 4,114,227 A * | 9/1978 | Blackman | 15/250.32 |
| 4,296,521 A | 10/1981 | Mower | |
| 4,300,259 A | 11/1981 | Maiocco | |
| 4,324,019 A | 4/1982 | Mohnach et al. | |
| 4,416,032 A | 11/1983 | Mohnach et al. | |
| 4,438,543 A | 3/1984 | Noguchi et al. | |
| 4,649,591 A * | 3/1987 | Guerard | 15/250.32 |
| 4,802,257 A | 2/1989 | Edele et al. | |
| 4,807,326 A | 2/1989 | Arai et al. | |
| 4,852,206 A | 8/1989 | Fisher | |
| 4,866,812 A | 9/1989 | Arai | |
| 4,980,944 A | 1/1991 | Longman | |
| 4,981,637 A | 1/1991 | Hyer | |
| 5,048,146 A | 9/1991 | Cavenago | |
| 5,145,274 A | 9/1992 | Schon | |
| 5,189,752 A * | 3/1993 | Longacre et al. | 15/250.41 |
| 5,257,436 A | 11/1993 | Yang | |
| 5,283,925 A | 2/1994 | Maubray | |
| 5,325,563 A | 7/1994 | Cayan | |
| 5,325,564 A | 7/1994 | Swanepoel | |
| 5,331,712 A * | 7/1994 | Charng | 15/250.41 |
| 5,383,249 A | 1/1995 | Yang | |
| 5,485,650 A | 1/1996 | Swanepoel | |
| 5,493,750 A | 2/1996 | Bollen et al. | |
| 5,553,962 A | 9/1996 | Eustache | |
| 5,564,157 A | 10/1996 | Kushida et al. | |
| 5,647,088 A * | 7/1997 | Bommer et al. | 15/250.201 |
| 5,715,563 A | 2/1998 | Marks | |
| 5,807,016 A | 9/1998 | Herring et al. | |
| 5,819,361 A * | 10/1998 | Merkel et al. | 15/250.46 |
| 5,845,650 A | 12/1998 | Limone | |
| 5,885,023 A * | 3/1999 | Witek et al. | 403/321 |
| 5,933,910 A | 8/1999 | Buechele et al. | |
| 5,946,764 A | 9/1999 | Tworzydlo | |
| 6,000,093 A | 12/1999 | Charng | |
| 6,012,197 A * | 1/2000 | Ponziani et al. | 15/250.46 |
| 6,055,697 A | 5/2000 | Wollenschlaeger | |
| 6,158,078 A | 12/2000 | Kotlarski | |
| 6,161,248 A | 12/2000 | Merkel et al. | |
| 6,178,588 B1 | 1/2001 | Kotlarski | |
| 6,192,546 B1 | 2/2001 | Kotlarski | |
| 6,202,251 B1 | 3/2001 | Kotlarski | |
| 6,226,829 B1 | 5/2001 | Kotlarski | |
| 6,253,411 B1 | 7/2001 | Aichele et al. | |
| 6,266,843 B1 | 7/2001 | Doman et al. | |
| 6,279,191 B1 | 8/2001 | Kotlarski et al. | |
| 6,292,974 B1 | 9/2001 | Merkel et al. | |
| 6,295,690 B1 | 10/2001 | Merkel et al. | |
| 6,305,066 B1 | 10/2001 | De Paoli et al. | |
| 6,308,373 B1 | 10/2001 | Merkel et al. | |
| 6,363,569 B1 | 4/2002 | Kotlarski | |
| 6,367,117 B1 * | 4/2002 | Sahara et al. | 15/250.201 |
| 6,397,428 B2 | 6/2002 | Kotlarski | |
| 6,427,282 B1 | 8/2002 | Kotlarski | |
| 6,427,283 B1 | 8/2002 | Dietrich et al. | |
| 6,449,797 B1 | 9/2002 | De Block | |
| 6,499,181 B1 | 12/2002 | Kotlarski | |
| 6,516,491 B2 | 2/2003 | Merkel et al. | |
| 6,523,218 B1 | 2/2003 | Kotlarski | |
| 6,530,111 B1 | 3/2003 | Kotlarski | |
| 6,539,576 B2 * | 4/2003 | Kim | 15/250.32 |
| 6,550,096 B1 | 4/2003 | Stewart et al. | |
| 6,553,607 B1 | 4/2003 | De Block | |
| 6,581,237 B1 | 6/2003 | Kotlarski | |
| 6,611,988 B1 | 9/2003 | De Block | |
| 6,625,842 B1 | 9/2003 | De Block | |
| 6,634,055 B1 | 10/2003 | De Block | |
| 6,634,056 B1 | 10/2003 | De Block | |
| 6,640,380 B2 * | 11/2003 | Rosenstein et al. | 15/250.32 |
| 6,643,889 B1 | 11/2003 | Kotlarski | |
| 6,668,419 B1 | 12/2003 | Kotlarski | |
| 6,675,432 B1 | 1/2004 | De Block | |
| 6,675,433 B1 | 1/2004 | Stewart et al. | |
| 6,675,434 B1 | 1/2004 | Wilhelm et al. | |
| 6,687,948 B2 | 2/2004 | Kotlarski | |
| 6,718,594 B1 | 4/2004 | Kotlarski | |
| 6,779,661 B1 | 8/2004 | Kotlarski | |
| 6,782,581 B2 | 8/2004 | Block | |
| 6,810,556 B1 | 11/2004 | Kotlarski | |
| 6,813,803 B2 | 11/2004 | Leutsch | |
| 6,836,926 B1 | 1/2005 | De Block | |
| 6,836,927 B2 | 1/2005 | De Block et al. | |
| 6,874,195 B2 | 4/2005 | Kotlarski et al. | |
| 6,886,213 B2 | 5/2005 | Merkel et al. | |
| 6,904,639 B2 | 6/2005 | Dietrich et al. | |
| 6,910,244 B2 | 6/2005 | De Block et al. | |
| 6,944,905 B2 | 9/2005 | De Block et al. | |
| 6,973,698 B1 | 12/2005 | Kotlarski | |
| 6,978,512 B2 | 12/2005 | Dietrich et al. | |
| 7,007,339 B2 | 3/2006 | Weiler et al. | |
| 7,143,463 B2 | 12/2006 | Baseotto et al. | |
| 7,228,588 B2 | 6/2007 | Kraemer et al. | |
| 7,293,321 B2 | 11/2007 | Breesch | |
| 7,337,900 B2 | 3/2008 | Reiber et al. | |
| 7,464,433 B2 | 12/2008 | Thomar et al. | |
| 7,481,596 B2 * | 1/2009 | Thienard | 403/329 |
| 7,484,264 B2 | 2/2009 | Kraemer et al. | |
| 7,506,401 B2 * | 3/2009 | Park | 15/250.32 |
| 7,523,519 B2 | 4/2009 | Egner-Walter et al. | |
| 7,523,520 B2 | 4/2009 | Breesch | |
| 7,559,110 B1 | 7/2009 | Kotlarski et al. | |
| 7,581,280 B2 | 9/2009 | Op't Roodt et al. | |
| 7,603,741 B2 | 10/2009 | Verelst et al. | |
| 7,603,742 B2 | 10/2009 | Nakano et al. | |
| 7,607,194 B2 | 10/2009 | Weber et al. | |
| 7,802,341 B2 | 9/2010 | Cempura et al. | |
| 7,832,047 B2 | 11/2010 | Herinckx et al. | |
| 7,836,541 B2 | 11/2010 | Harita et al. | |
| 7,836,542 B2 | 11/2010 | Dietrich et al. | |
| 7,950,101 B2 * | 5/2011 | Kim | 15/250.32 |
| 8,151,406 B2 | 4/2012 | Machida et al. | |
| 8,181,308 B2 | 5/2012 | Kwon et al. | |
| 8,191,200 B2 * | 6/2012 | Kim | 15/250.32 |
| 8,196,255 B2 | 6/2012 | De Block et al. | |
| 8,266,759 B2 | 9/2012 | Braun et al. | |
| 8,272,096 B2 * | 9/2012 | Wilms et al. | 15/250.32 |
| 8,286,298 B2 * | 10/2012 | Kim | 15/250.32 |
| 8,347,450 B2 | 1/2013 | Amano | |
| 8,510,898 B2 | 8/2013 | Ku | |
| 2003/0014828 A1 | 1/2003 | Edner-Walter et al. | |
| 2003/0066153 A1 * | 4/2003 | Rosenstein et al. | 15/250.32 |
| 2004/0074027 A1 * | 4/2004 | Op't Roodt | 15/250.32 |
| 2005/0177970 A1 | 8/2005 | Scholl et al. | |
| 2006/0207050 A1 * | 9/2006 | Shanmugham et al. | 15/250.43 |
| 2006/0218740 A1 | 10/2006 | Coughlin | |
| 2007/0192984 A1 * | 8/2007 | Park | 15/250.201 |
| 2007/0199174 A1 * | 8/2007 | Op't Roodt | 15/250.32 |
| 2007/0226940 A1 | 10/2007 | Thienard | |
| 2007/0234501 A1 * | 10/2007 | Ho et al. | 15/250.32 |
| 2008/0201892 A1 | 8/2008 | Fujiwara et al. | |
| 2008/0235896 A1 * | 10/2008 | Cheng | 15/250.201 |
| 2008/0289133 A1 * | 11/2008 | Kim | 15/250.32 |
| 2009/0113653 A1 * | 5/2009 | Thienard | 15/250.32 |
| 2009/0307862 A1 | 12/2009 | Boland | |

(56) References Cited

U.S. PATENT DOCUMENTS

| | | |
|---|---|---|
| 2010/0050361 A1 | 3/2010 | Chang et al. |
| 2010/0205763 A1 | 8/2010 | Ku |
| 2010/0281645 A1 | 11/2010 | Kim et al. |
| 2011/0047740 A1 | 3/2011 | Weber |
| 2011/0047742 A1 | 3/2011 | Kim et al. |
| 2011/0056041 A1 | 3/2011 | Wu |
| 2011/0083295 A1 | 4/2011 | Kim et al. |
| 2011/0162162 A1 | 7/2011 | Fujiwara et al. |
| 2011/0277264 A1 | 11/2011 | Ehde |
| 2012/0060315 A1 | 3/2012 | Avasiloaie et al. |
| 2012/0060316 A1 | 3/2012 | Avasiloaie et al. |
| 2012/0180245 A1 | 7/2012 | Ku |

FOREIGN PATENT DOCUMENTS

| | | |
|---|---|---|
| DE | 19729865 | 1/1969 |
| DE | 2313939 | 9/1974 |
| DE | 2640399 | 3/1977 |
| DE | 3222864 | 12/1983 |
| DE | 19627115 | 1/1998 |
| DE | 19734843 | 2/1999 |
| DE | 19736368 | 2/1999 |
| DE | 19814610 | 10/1999 |
| DE | 19856299 | 6/2000 |
| DE | 19856300 | 6/2000 |
| EP | 0316114 | 5/1989 |
| EP | 0528643 | 2/1993 |
| EP | 0594451 | 4/1994 |
| EP | 0646507 | 4/1995 |
| EP | 1257445 | 8/2001 |
| EP | 1256496 | 11/2002 |
| EP | 1849666 | 10/2007 |
| FR | 2222855 | 10/1974 |
| FR | 2731191 | 9/1996 |
| GB | 1425568 | 2/1976 |
| GB | 2313042 | 11/1997 |
| JP | 04108470 | 9/1992 |
| JP | 2001260823 A | 9/2001 |
| JP | 2003312451 | 11/2003 |
| JP | 2006507991 | 3/2006 |
| JP | 2006519721 A | 8/2006 |
| JP | 2006525903 | 11/2006 |
| JP | 2008213552 | 9/2008 |
| JP | 2008230340 | 10/2008 |
| JP | 2008539115 | 11/2008 |
| JP | 2011251567 | 12/2011 |
| KR | 100678408 B1 | 1/2007 |
| KR | 100692369 | 3/2007 |
| KR | 1020080099013 | 11/2008 |
| KR | 1020080105227 | 12/2008 |
| KR | 1020080108360 | 12/2008 |
| KR | 100891195 B1 | 4/2009 |
| KR | 1020090042785 | 4/2009 |
| KR | 1020090100975 | 9/2009 |
| KR | 1020090115144 | 11/2009 |
| KR | 200449008 | 6/2010 |
| KR | 101201547 | 11/2012 |
| WO | 9532112 | 11/1995 |
| WO | 9801327 | 1/1998 |
| WO | 9902382 | 1/1999 |
| WO | 9902383 | 1/1999 |
| WO | 9910211 | 3/1999 |
| WO | 9912784 | 3/1999 |
| WO | 0034090 | 6/2000 |
| WO | 0038962 | 6/2000 |
| WO | 0038964 | 7/2000 |
| WO | 0048877 | 8/2000 |
| WO | 0050276 | 8/2000 |
| WO | 0149537 | 7/2001 |
| WO | 0162561 | 8/2001 |
| WO | 2006106006 | 10/2006 |
| WO | 2007102404 | 9/2007 |
| WO | 2008019903 | 2/2008 |
| WO | 2008101561 | 8/2008 |

\* cited by examiner

MULTI-ADAPTER FOR A VEHICLE WIPER

CROSS-REFERENCE TO RELATED APPLICATION

This application is the U.S. national phase of PCT Appln. No. PCT/KR2010/005646 filed Aug. 24, 2010, which claims priority to Korean application KR 10-2009-0079242 filed Aug. 26, 2009 on the disclosures of which are incorporated in their entirety by reference herein.

FIELD OF THE INVENTION

The present invention relates to a multi-adapter for a vehicle wiper, more particularly, a multi-adapter for a vehicle wiper which, by providing an adapter body with a plurality of pin coupling portions and a plurality of protrusions, enables conventional side pin-type arms, which require an additional auxiliary member for compatibility with the adapter, to be coupled to the adapter without using an auxiliary member and in addition can be used in common for various types of arms.

BACKGROUND OF THE INVENTION

In general, in case of automobiles, if a surface of glass window is polluted due to dusts or various foreign matters in the air or weather-related snow or rain, it is difficult to secure the field of vision, thus safe driving is hindered. Therefore, as means for securing the field of vision for safe driving of the driver, a wiper device for vehicle is installed which wipes out snow, rain or foreign matters etc. on the surface of glass window.

A wiper device according to a prior art comprises a blade of a predetermined length made of soft rubber for wiping out snow, rain or polluting matters while moving in close contact with the surface of glass window; a body spring coupled to upper end of the blade and having a predetermined curvature and elastic force; a resting plate coupled to the body spring at center thereof in a longitudinal direction; an adapter coupled to the resting plate; and a longitudinal arm for delivering rotational power by connecting one end of the arm to a motor installed in the vehicle and detachably connecting the other end to the adapter.

Here, conventional adapter is launched as a dedicated product of a form corresponding to the arm in order to receive an arm having a standard and form different for a type of vehicle.

Namely, conventional arms for vehicle are mainly classified into "U"-shaped clip type with a latching structure, pin type wherein protrusions are formed on side portions and fitting structure is achieved by means of the protrusions; and side pin type wherein fitting and coupling are achieved on the side portion of the adapter. Such various types of arms are different from each other in its form or size, thus have its limitation that it can be used only for dedicated adapter.

Therefore, the applicant has filed an application relating to an adapter which can be applied to arms with various standards and forms, and such an adapter is disclosed in Korean Registration Patent No. 10-0891195 titled "universal wiper device for vehicle".

By the way, such conventional adapter has to additionally couple an auxiliary adapter for connection of the side pin-type arm in order to apply the arm.

Figure 2:
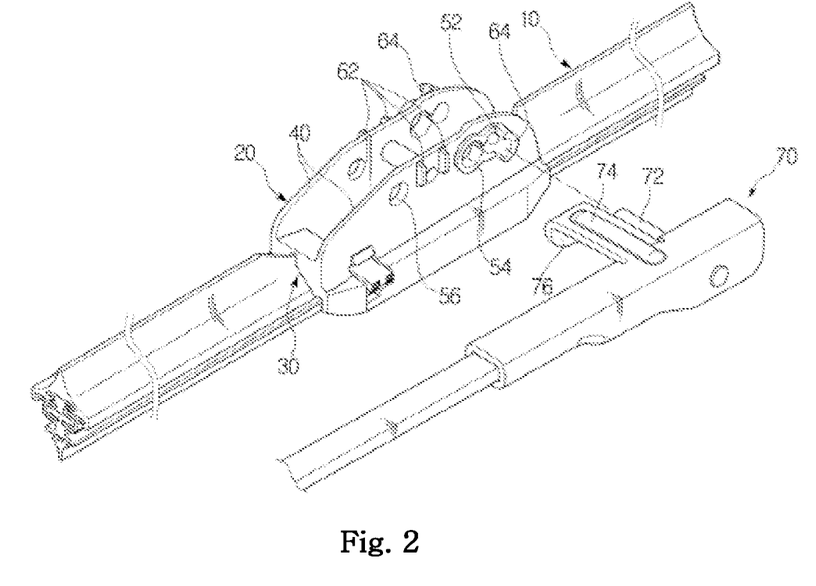
FIGS. 2 and 3 show a coupling state where the side pin-type arm is coupled to the multi-adapter for a vehicle wiper according to the first example of the present invention.
Figure 5:
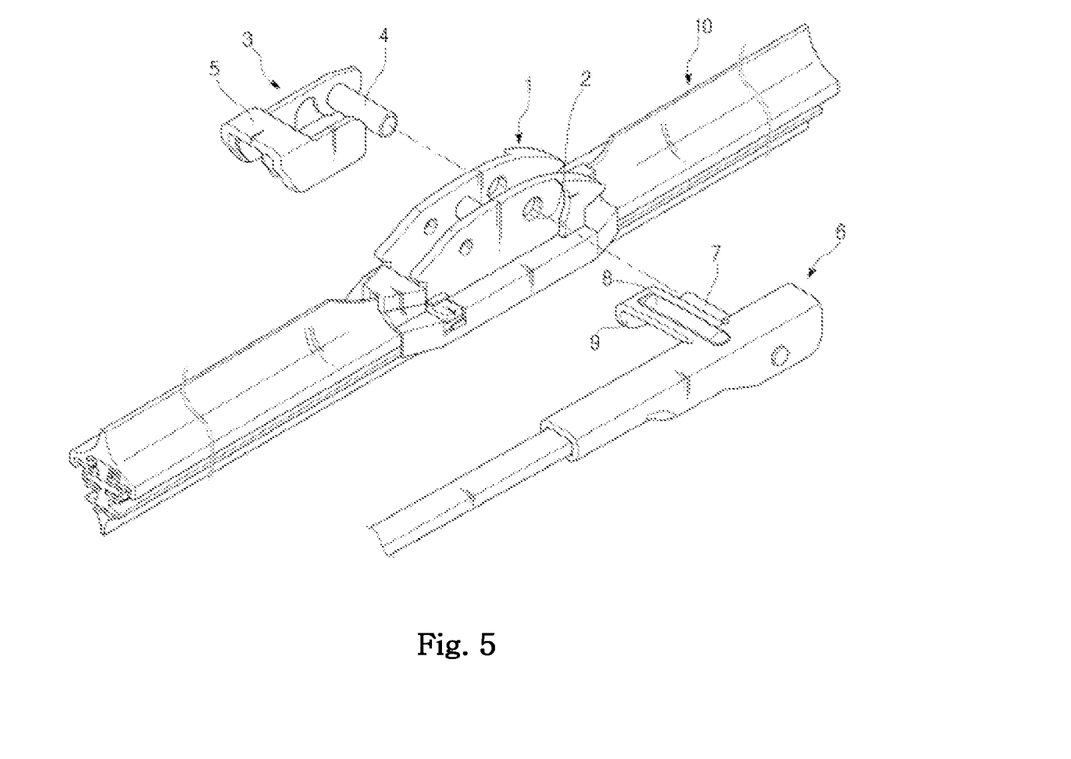
FIG. 5 shows a coupling state where a side pin-type arm is coupled by coupling an auxiliary adapter to an adapter for a vehicle wiper according to a prior art.

FIG. 5 shows a coupling state where a side pin-type arm is coupled by coupling an auxiliary adapter to an adapter for a vehicle wiper according to a prior art, and FIG. 2 shows a coupling state where the side pin-type arm is coupled to the adapter for a vehicle wiper according to a prior art without the auxiliary adapter.

Referring to FIG. 5, in the case of coupling the side pin-type arm (6) to the adapter (1) for a vehicle wiper according to a prior art, the auxiliary adapter (3) has to be additionally coupled to pin holes (2) formed in the adapter (1). The auxiliary adapter (3) is coupled to the pin holes (2) and comprises a hollow auxiliary pin (4) and an auxiliary cover (5) coupled to top portion of the adapter (1).

Furthermore, the side pin-type arm (6) coupled to the auxiliary adapter (3) comprises a pin (7) inserted into and coupled to the auxiliary pin (4) of the auxiliary adapter (3), a cover (8) coupled to top portion of the auxiliary cover (5) of the auxiliary adapter (3), and a securing piece (9) coupled to a side surface of the auxiliary cover (5).

Namely, the auxiliary adapter (3) is arranged such that, in order that standards of the pin (7) provided on the arm (6) and the pin holes (2) of the adapter (1) match with each other such that the side pin-type arm (6) is compatible with the adapter (1), the auxiliary pin (4) having a hole with a smaller diameter than the pin holes (2) is coupled to the pin holes (2), and width is increased by wrapping the top portion of the adapter (1) with the auxiliary cover (5), whereby the cover (8) and securing piece (9) provided on the arm (6) can be firmly coupled.

Figure 6:
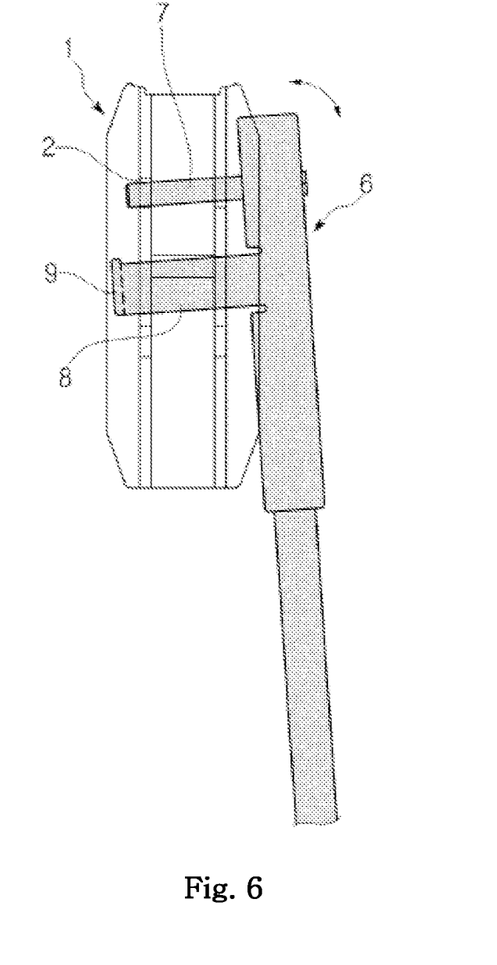
FIG. 6 shows a coupling state where the side pin-type arm is coupled to the adapter for a vehicle wiper according to a prior art without the auxiliary adapter.

For such a construction, if the side pin-type arm (6) is coupled without the auxiliary adapter (3), as shown in FIG. 6, the pin holes (2) of the adapter (1) and the pin (7) of the arm (6) do not coincide with each other and width of the adapter (1) and the width of the arm (6) do not coincide with each other, therefore a problem is shown that the arm (6) is loosely coupled to the adapter (1) or separated from the adapter (1).

Therefore, for the conventional adapter for a vehicle wiper, the auxiliary adapter has to be additionally provided for using of the side pin-type arm, which results in a problem that production cost is increased and inconvenience of users is caused.

SUMMARY OF THE INVENTION

In view of the above-mentioned problems of the prior art, the present invention has been devised for solving the problems, and its object is to provide a multi-adapter for a vehicle wiper wherein, by providing an adapter body with a plurality of pin coupling portions and a plurality of protrusions, a gap is maintained which is as wide as when the auxiliary adapter is coupled, through the plurality of protrusions being closely contacted with the arm when the side pin-type arm is coupled to a pin coupling portion, and thus the arm can be coupled only by a single adapter without using the auxiliary adapter, and therefore, convenience of users can be increased and production cost can be reduced.

For achieving the above-mentioned object, the present invention is characterized in that the multi-adapter for a vehicle wiper comprises a coupling portion coupled to a blade; a pair of side plates protruding from the coupling portion such that the side plates are parallel to each other, wherein a hinge shaft is formed in inner side of a pair of side plates; a plurality of pin coupling portions which are formed at the pair of side plates, and to which arms with pins of different sizes are selectively coupled; and a plurality of protrusions formed on at least one of the pair of the side plates so as to maintain a gap between the arm and the pair of side plates.

Furthermore, the present invention is characterized in that the pin coupling portions comprise a plurality of pin holes each having different size and coaxially formed through the pair of side plates.

Furthermore, the present invention is characterized in that the protrusions comprise first protrusions provided at at least one of the plurality of the pin holes and projected from at least one of the pair of side plates so as to maintain a gap between the arm and the side plate; and second protrusions projected from at least one of the pair of side plates so as to maintain a gap of with the arm, thereby preventing the arm from playing in a direction opposite to a coupling direction of the pin.

Furthermore, the present invention is characterized in that the first protrusions are projected along a part of the circumference of at least one of the plurality of pin holes.

Furthermore, the present invention is characterized in that the multi-adapter further comprises a connector detachably coupled to the hinge shaft and allowing arms having a "U"-shaped hook or arms having the pins of different sizes to be selectively coupled.

According to the present invention, conventional side pin-type arms, which require an additional auxiliary member for compatibility with the adapter, can be coupled without using the auxiliary member and thus the arm can be coupled only by a single adapter, and therefore, convenience of users can be increased and production cost can be reduced, and in addition the multi-adapter can be used in common for various types of arms.

DETAILED DESCRIPTION OF EXEMPLARY EMBODIMENTS

Hereinafter, examples of the present invention will be described in detail, but the present invention is not limited to the following examples as long as its gist is not departed.

Figure 1:
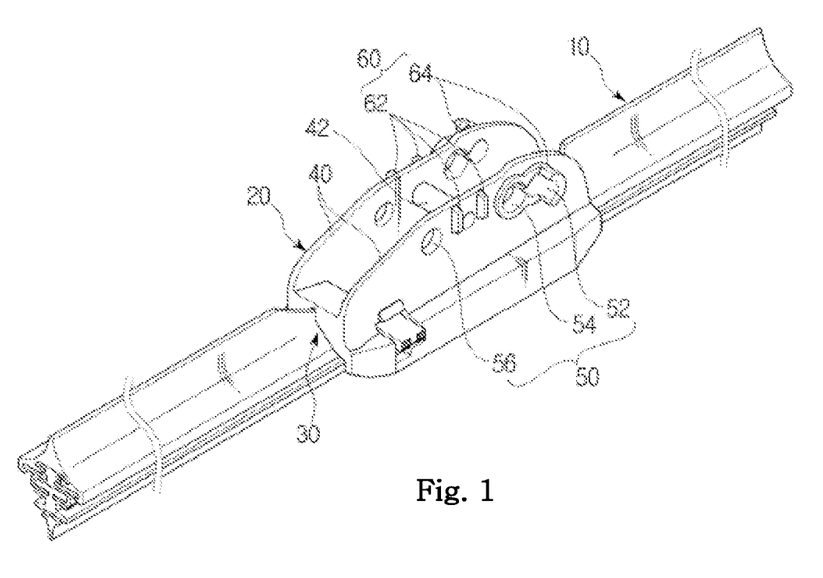
FIG. 1 is a perspective view showing the construction of a multi-adapter for a vehicle wiper according to a first example of the present invention.

FIG. 1 is a perspective view showing the construction of a multi-adapter for a vehicle wiper according to a first example of the present invention.

Referring to FIG. 1, the multi-adapter (20) for a vehicle wiper according to a first example of the present comprises a coupling portion (30) coupled to a blade (10); a pair of side plates (40) protruding from the coupling portion (30) such that the side plates are parallel to each other, wherein a hinge shaft (42) is formed in inner side of the side plates; a plurality of pin coupling portions (50) which are formed at the pair of side plates (40), and to which arms with pins of different sizes are selectively coupled; and a plurality of protrusions (60) formed on at least one of the pair of the side plates so as to maintain a gap between the arm and the pair of side plates (40).

In the following, each of the constructions of the multi-adapter (20) for a vehicle wiper according to the first example is described. The coupling portion (30) is coupled with a blade (10) for wiping a surface of glass of the vehicle.

The pair of side plates (40) are extended from top portion of the coupling portion (30), and the hinge shaft (42) is formed between the pair of the side plates (40).

The pin coupling portions (50) are provided at the pair of the side plates (40), and an arm for rotating the blade (10) is coupled with the pin coupling portions. The pin coupling portions have a plurality of pin holes (52, 54, 56) to which various pin-type arms are selectively coupled. Regarding the construction of such pin coupling portions (50), the pin coupling portions comprise a first pin holes (52), a second pin holes (54) and a third pin holes (56) each having different size and coaxially formed through the pair of side plates (40).

In other words, the first pin holes (52), second pin holes (54) and third pin holes (56) of the pin coupling portions (50) are formed with different diameters from each other such that the pins of the arms with different sizes can be selectively coupled, wherein the first pin holes (52) and second pin holes (54) are arranged in such a manner that centers of the first and second holes are adjacent to each other, and are formed through one side of the pair of the side plates (40), and the third pin holes (56) are formed through the other side of the pair of the side plates (40).

The protrusions (60) are provided as a first protrusion and a second protrusion on the pair of side plates (40), and serve to maintain a gap between the arm and the pair of side plates (40) such that side pin-type arm can be coupled without an auxiliary member.

The first protrusions (62) is projected along a part of the circumference of the first pin holes (52), and maintain a gap between the arm and the pair of side plates (40) when the pin of the arm is coupled to the first pin holes (52).

Namely, the first protrusions (62) is provided such that side pin-type arm can be coupled without an auxiliary adapter, and maintains a gap between the arm and the pair of side plates so as to obtain a width which is as wide as when the auxiliary adapter is coupled, through the first protrusion (62) protruded from the first pin holes (52) being closely contacted with the arm when the pin of the arm is coupled to the first pin holes (52).

The second protrusions (64) are projected on both sides of upper part of the pair of side plates (40), maintain a gap between a securing piece arranged on a cover of the arm and the side plates, and prevent the arm from playing in a direction opposite to a coupling direction of the pin.

As described above, if the pin of the side pin-type arm is coupled to the first pin holes (52) and thus the cover of the arm covers top portion of the pair of side plates (40), the securing piece arranged on the cover of the arm is closely contacted with the second protrusions (64) projected from both sides of upper part of the pair of side plates (40) to thereby maintain the gap between the arm and the side plates, and secure the securing piece of the arm on the second protrusion (64) such that the pin of the arm cannot play leftward and rightward along the first pin holes (52), whereby the arm can be firmly coupled to the pair of side plates (40).

In this connection, providing of the first protrusions (62) and second protrusions (64) on both of the pair of side plates (40) is for the purpose of allowing the side pin-type arms for coupling on the left side and right side, respectively, to be simultaneously compatible.

Figure 3:
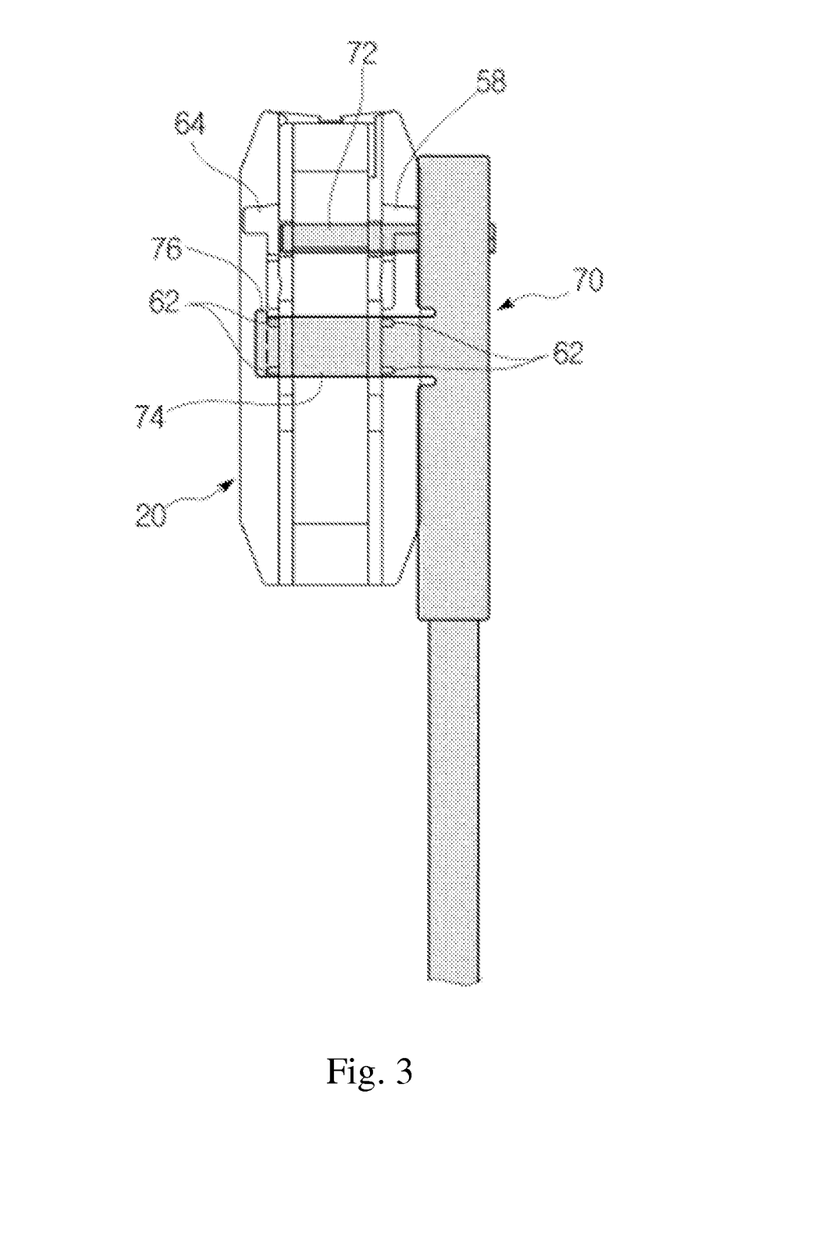

FIGS. 2 and 3 show a coupling state where the side pin-type arm is coupled to the multi-adapter for a vehicle wiper according to the first example of the present invention.

Referring to FIGS. 2 and 3, in the case of coupling the side pin-type arm (70) to the multi-adapter (20) for a vehicle wiper, the pin (72) of the arm (70) is fitted into the first pin holes (52) having a standard matching with that of the pin (72) of the arm (70), and thereafter the cover (74) of the arm (70) and the securing piece (76) formed on the cover (74) are coupled so as to cover the top portion of the pair of side plates (40).

In this regard, the first protrusions (62) projected along a part of the circumference of the first pin holes (52) is closely contacted with the body of the arm (70) such that the arm (70) can be coupled without the auxiliary adaptor, thereby maintaining a gap between the arm (70) and the side plates, and the securing piece (76) of the arm is closely contacted with the second protrusion (64) on the opposite side of the first protrusions (62) closely contacted with the arm (70), thereby maintaining a gap, and at the same time, the securing piece (76) of the arm (70) is secured on the second protrusions (64) of the pair of side plates (40) such that pin (72) of the arm (70) cannot play leftward and rightward along the first pin holes (52), whereby the arm (70) can be firmly coupled to the pair of side plates (40).

With the above-described processes, the first protrusions (62) and second protrusions (64) are closely contacted with the arm (70) to maintain a width which is as wide as when the auxiliary adapter is coupled, whereby the arm can be firmly coupled only by a single adapter, without the auxiliary adapter.

Figure 4:
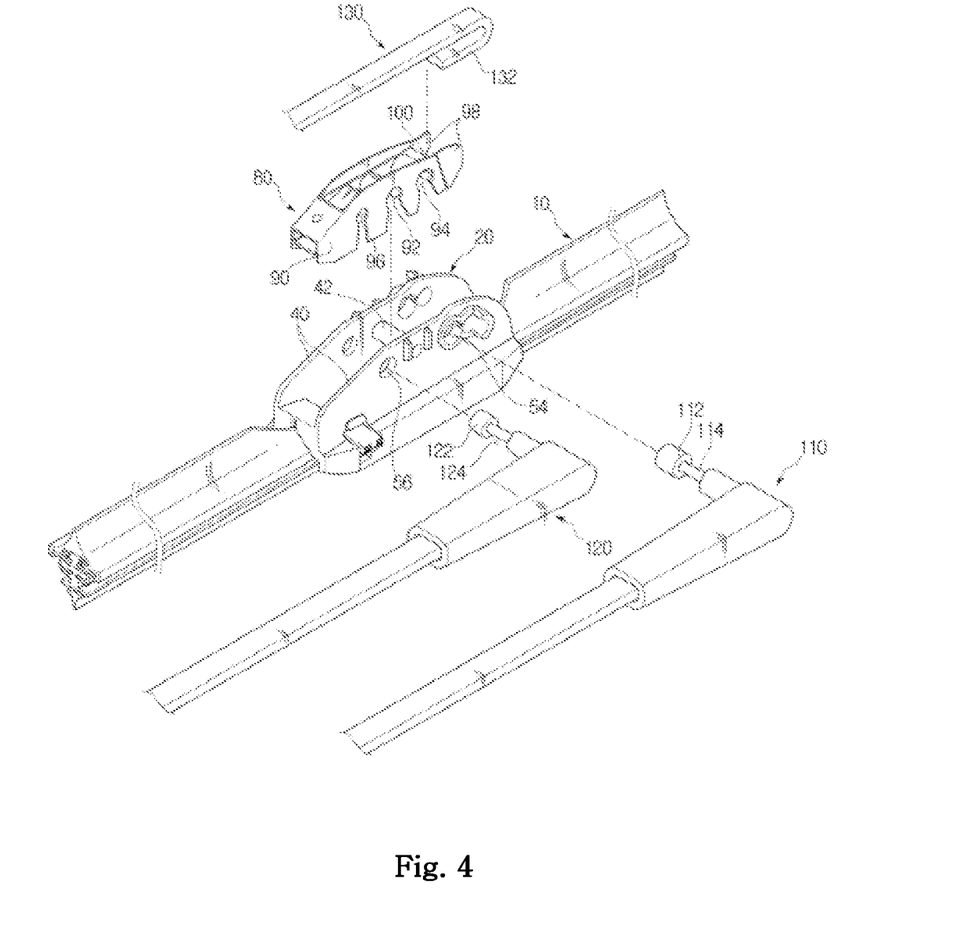
FIG. 4 shows a coupling state where various types of arms are coupled to the multi-adapter for a vehicle wiper according to a second example of the present invention.

FIG. 4 shows a coupling state where various types of arms are coupled to the multi-adapter for a vehicle wiper according to a second example of the present invention.

Referring to FIG. 4, the multi-adapter (20) for a vehicle wiper according to the second example of the present further comprises a connector (80) for allowing arms having the pins of different sizes and an arm having a "U"-shaped hook to be selectively coupled.

The connector (80) is provided between the pair of side plates (40), and comprises a body (90) which is formed with a hinge groove (92) detachably coupled to the hinge shaft (42) and a first communication groove (94) and second communication groove (96) communicating with the second pin holes (54) and third pin holes (56), respectively such that the arms having the pins of different sizes can be selectively mounted.

In other words, if the hinge groove (92) formed on the lower portion of the body (90) is coupled to the hinge shaft (42) arranged between the pair of side plates (40), the body (90) is disposed between the pair of side plates (40), whereby centers of the first communication groove (94) and second communication groove (96) of the body (90) coincide and communicate with centers of the second pin holes (54) and third pin holes (56) formed in the pair of side plates (40), respectively. In this connection, diameters of the first communication groove (94) and second communication groove (96) are different from each other and smaller than those of the corresponding second pin holes (54) and third pin holes (56).

As shown in FIG. 4, the pins of the arms may be selectively coupled to the second pin holes (54) and third pin holes (56) depending on a standard of the pin. In the case of coupling the pin of the arm to the second pin holes (54), after the pin (112) of the arm (110) having a standard matching with that of the second pin holes (54) is inserted into the second pin holes (54), the hinge groove (92) of the connector (80) is coupled to the hinge shaft (42) arranged between the pair of side plates (40), and thus the first communication groove (94) formed in the body (90) of the connector (80) is coupled to a pin groove (114) formed on the pin (112) of the arm (110).

In the case of coupling the pin of the arm to the third pin holes (56), with the same processes as the above-mentioned processes, the pin (122) of the arm (120) having a standard matching with that of the third pin holes (56) is coupled, and the second communication groove (96) of the connector (80) is coupled to a pin groove (124) of an arm (120).

Meanwhile, a hook-latching portion (100) is provided in the connector (80), coupled to which portion is a hook (132) of an arm (130) having a "U"-shaped hook. The hook-latching portion (100) is provided at front end of the body (90), so that the hook (132) of the arm (130) is coupled to the hook-latching portion (100) while surrounding it.

In this connection, separation-preventing protrusions (98) for supporting both sides of the arm are formed on both sides of the hook-latching portion (100) along a longitudinal direction of the body (90), and thanks to the separation-preventing protrusions (98), the arm (130) having a "U"-shaped hook can be firmly coupled.

As described above, the multi-adapter for a vehicle wiper according to the present invention enables conventional side pin-type arms, which require an additional auxiliary member for compatibility with the adapter, to be coupled without using the auxiliary member, and thus the arm can be coupled only by a single adapter, and therefore, convenience of users can be increased and production cost can be reduced, and in addition the multi-adapter can be used in common for various types of arms.

The present invention may be substituted or modified without departing from the technical concept of the present invention by persons having ordinary skills of the technical field to which the present invention belongs, and therefore is not limited to the above-described examples and the attached drawings.

What is claimed is:

1. A multi-adapter for a vehicle wiper, comprising:
a coupling portion coupled to a blade;
a pair of side plates protruding from the coupling portion such that the side plates are parallel to each other, wherein a hinge shaft is formed between the side plates;
a plurality of pin coupling portions formed at the pair of side plates, respectively, the pin coupling portions including a plurality of pin holes each having different size and coaxially formed through the pair of side plates so that one of a plurality of arms having pins of different sizes may be selectively coupled to a corresponding side plate; and
a plurality of protrusions formed on at least one of the pair of the side plates so as to maintain a gap between the arm and the pair of side plates, the plurality of protrusions having differing heights as measured from the side plates with respect to each other,
wherein the protrusions protrude outwardly from at least one of the pair of side plates for contacting a corresponding arm, and wherein the protrusions comprise:
a first protrusion provided adjacent to at least one of the plurality of the pin holes and projected from at least one of the pair of side plates so as to maintain a gap between the arm and a side plate by directly engaging one side of the arm, and
a second protrusion projected from at least one of the pair of side plates so as to maintain a gap with the arm by directly engaging an inner side of a securing piece disposed on the arm, thereby preventing the arm from playing in a direction opposite to the pin.

2. The multi-adapter for a vehicle wiper according to claim 1, wherein the first protrusions are projected along a part of the circumference of at least one of the plurality of pin holes.

3. The multi-adapter for a vehicle wiper according to claim 1, wherein the multi-adapter further comprises a connector detachably coupled to the hinge shaft and allowing arms having a "U"-shaped hook or arms having the pins of different sizes to be selectively coupled.

4. A wiper blade assembly capable of receiving multiple wiper arm types comprising:
a blade;
a multi-adapter coupled to an upper portion of the blade having a pair of parallel side plates protruding upwardly from the blade, and a hinge shaft formed between the side plates;
a plurality of differently sized pin coupling portions formed through the pair of side plates including coaxially formed holes each having a different size, the pin coupling portions each configured to receive one of a plurality of wiper arms having different pin sizes; and
a plurality of protrusions extending laterally from an outer portion of at least one of the pair of the side plates to directly engage a wiper arm, wherein the wiper arm is removably secured to the multi-adapter and a relative gap between the side plates and the wiper arm is set by the protrusions, and the plurality of protrusions are formed having differing heights as measured from the side plates with respect to each other, the plurality of protrusions further comprising:
a first protrusion provided adjacent to at least one of the coaxially formed holes and projected from at least one of the pair of side plates so as to maintain a gap between the arm and a side plate by directly engaging one side of the arm, and
a second protrusion projected from at least one of the pair of side plates so as to maintain a gap with the arm by directly engaging an inner side of a securing piece disposed on the arm, thereby preventing the arm from playing in a direction opposite to the pin.

5. The wiper blade assembly of claim 4 further comprising a connector detachably coupled to the hinge shaft and allowing a plurality of wiper arm types to be selectively coupled to the multi-adapter.

6. The wiper blade assembly of claim 5 wherein the multi-adapter is capable of receiving at least a first wiper arm type comprising a "U"-shaped retention hook, a second wiper arm type comprising a lateral pin having one of a plurality of sizes, and a third wiper arm type comprising a lateral pin and an integral securing cover to be received about a top portion of the multi-adapter.

\* \* \* \* \*